United States Patent [19]
Callele

[11] Patent Number: 5,206,900
[45] Date of Patent: Apr. 27, 1993

[54] AUTOMATED ATTENDANT

[76] Inventor: David Callele, 2014 Cairns Avenue, Saskatoon, Saskatchewan, Canada

[21] Appl. No.: 708,722

[22] Filed: May 31, 1991

[51] Int. Cl.$^5$ .................. H04M 1/64; H04M 1/57
[52] U.S. Cl. .................... 379/142; 379/265; 379/257
[58] Field of Search ............ 379/142, 210, 211, 212, 379/246, 265, 257

[56] References Cited

U.S. PATENT DOCUMENTS

| | | | |
|---|---|---|---|
| 4,558,180 | 12/1985 | Scordo | 179/18 |
| 4,580,012 | 4/1986 | Matthews et al. | 179/18 |
| 4,680,785 | 7/1987 | Akiyama et al. | 179/18 |
| 4,747,127 | 5/1988 | Hansen et al. | 379/94 |
| 4,821,308 | 4/1989 | Hashimoto | 179/2 |
| 4,825,456 | 4/1989 | Rosenberg | 379/57 |
| 4,825,460 | 4/1989 | Carter et al. | 379/67 |
| 4,852,149 | 7/1989 | Zwick et al. | 379/67 |
| 4,866,758 | 9/1989 | Heinzelmann | 379/94 |
| 4,868,860 | 9/1989 | Andros et al. | 340/825.44 |
| 4,926,461 | 5/1990 | Kuok | 379/88 |
| 4,926,462 | 5/1990 | Ladd et al. | 379/67 |
| 4,942,598 | 7/1990 | Davis | 379/57 |
| 4,961,216 | 10/1990 | Baehr et al. | 379/56 |
| 4,995,073 | 2/1991 | Okata et al. | 379/93 |
| 5,054,055 | 10/1991 | Hanle et al. | 379/142 |

Primary Examiner—Stafford D. Schreyer
Attorney, Agent, or Firm—Dressler, Goldsmith, Shore, Sutker & Milnamow

[57] ABSTRACT

A device and method for interfacing a telephone to the telephone network is disclosed for receiving the ICLID of incoming telephone calls and responding in a predetermined manner. An ICLID receiver detects the presence or absence of the ICLID of an incoming telephone call, and receives the ICLID if present. In accordance with predetermined instructions and with the absence of an ICLID or the presence and identity of the ICLID, the device may acknowledge receipt of the ICLID to the incoming caller by generating a brief confirmation tone at minimum charge to the calling party, cause the incoming call to be answered or not answered, and may forward the incoming ICLID information to a predetermined location over the telephone network or by other means.

14 Claims, 4 Drawing Sheets

AUTOMATED ATTENDANT

BACKGROUND OF THE INVENTION

Many telephone calls are not completed because there is nobody in attendance to answer the telephone. People have attempted to get around this problem by installing answering machines and their more sophisticated brethren, the voice mail system. However, many people dislike talking to an answering machine or a voice mail system; and, if the call is long distance, then toll charges apply and the calling party must pay for the dubious privilege of listening to the message on the answering machine.

A mechanism is needed that does not cost the calling party anything if no one is there to receive the call yet identifies the calling party and how to contact them.

The present invention performs this task in a novel manner.

The telephone operating companies around the world are currently deploying Signalling System 7 (SS7) control links within their telephone networks. These links are used to pass control information between telephone switches to allow more efficent use of network resources. One piece of information that is transmitted along these links is commonly referred to as the Incoming Calling Line IDentification (ICLID). This is (typically) the Diallable Number (DN) representing the Customer Premise Equipment (CPE) from which the call is being placed.

Many forms of providing the ICLID to the called party are available or proposed. Historically (prior to the introduction of SS7), this ICLID was only available for calls that originated and terminated on the same telephone switch. An example is the internal extension number that has long been available on CENTREX ® systems. Today, ICLID information is currently being made available on a more general basis in North America through the services referred to as Custom Local Area Signalling Services (CLASS) in the USA and Call Management Services (CMS) in Canada. As well, the proposed ISDN networks will have ICLID delivery capabilities.

The present invention makes use of this ICLID information to provide automated attendant functions.

SUMMARY OF THE INVENTION

The present invention provides a telephone interface apparatus which includes stored program logic control means for automatically responding in one of a number of possible ways to an incoming call having signalling information such as ICLID information. For example, depending on the signalling information, the logic control means may cause the incoming call to be answered or not answered. If not answered, a brief confirmation signal may be sent to the calling party. The apparatus includes a data receiver for receiving signalling information, such as ICLID information, means for placing the apparatus in an off-hook or an on-hook condition and means for generating dialling signals onto the public switched telephone network, The apparatus may also include one or more of a data modem, a facsimile modem, a voice synthesizer means or voice playback means and a computer network interface, all under control of the logic control means. The apparatus can call back a calling party and effect a connection to a predetermined destination when both are off-hook.

BRIEF DESCRIPTION OF THE DRAWINGS

The invention will now be described in detail with reference to the accompanying drawings, in which.

DETAILED DESCRIPTION OF THE INVENTION

The invention will be described in detail for a system that receives the ICLID information via the CLASS/CMS delivery mechanism. The system, with the exception of the ICLID receiver, is the same for all protocols. One ordinarily skilled in the art could reasonably be expected to replace the CLASS/CMS receiver with a receiver for CENTREX, ISDN or other signalling. The specifications for these interfaces are readily available.

Figure 1:
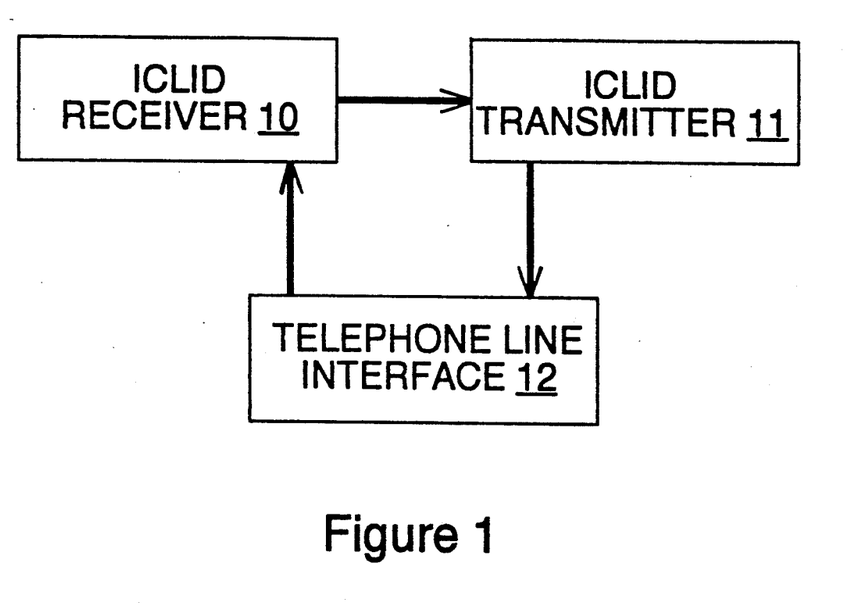
FIG. 1 illustrates the conceptual nature of the minimal system via a block diagram.

With reference to FIG. 1, the simplest way to describe the present invention is as a telephone line interface 12, coupled to an ICLID receiver 10, and an ICLID transmitter 11. The telephone line interface 12 provides the appropriate electrical terminating characteristics to comply with network interfacing standards for the ICLID transmission standard used in this instance of the system. The ICLID receiver 10 decodes the ICLID transmission received through the telephone line interface 12 and stores it. The incoming call is not answered (because there is no one in attendance) and, eventually, the calling party hangs up. The ICLID transmitter now proceeds to the off hook state and places a telephone call to a predetermined destination. The ICLID transmitter 11 forwards the ICLID information from the ICLID receiver 10 once the destination has answered.

The process therefore consists of:
1) predetermination of forwarding destination;
2) incoming call is received;
3) ICLID transmission is received;
4) ICLID transmission is decoded;
5) ICLID transmission is stored;
6) calling party abandons call;
7) ICLID transmitter originates call to predetermined destination;
8) predetermined destination answers call;
9) ICLID transmitter forwards stored ICLID information.

Figure 2:
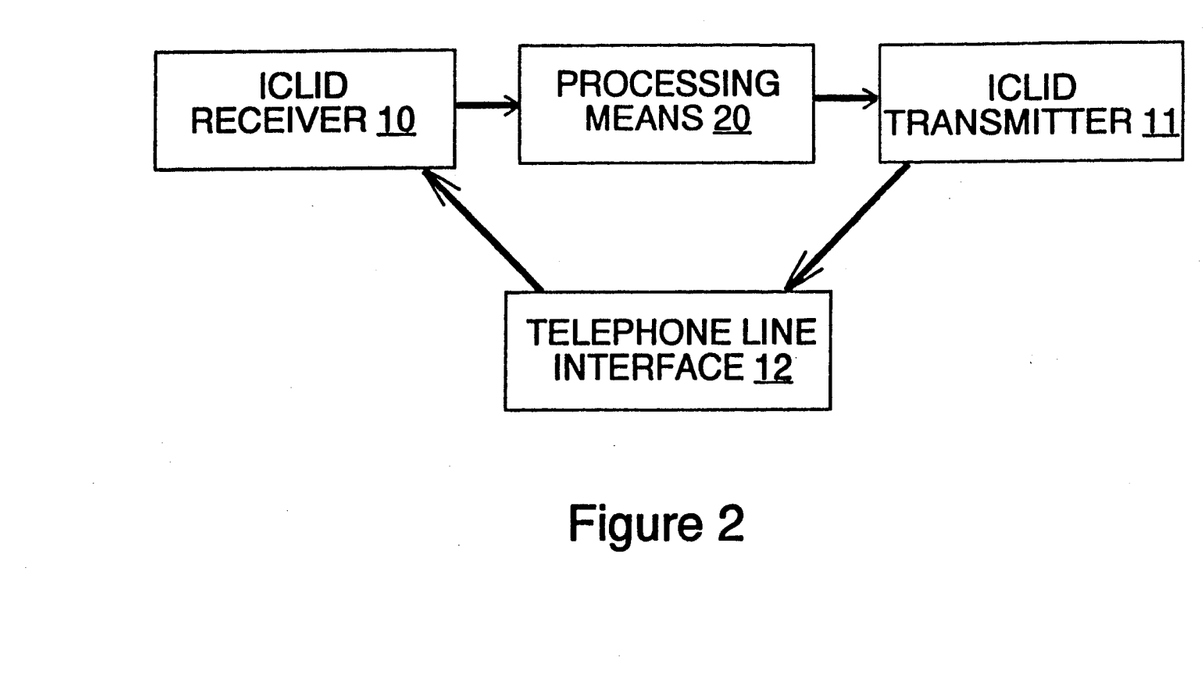
FIG. 2 illustrates the conceptual nature of a programmable system via a block diagram.

With reference to FIG. 2, this mechanism may be extended by increasing the functionality between steps (5), (6) and (7). By inserting processing means 20 between the ICLID receiver 10 and the ICLID transmiter 11, greater functionality can be added. This functionality can include the ability to react in different manners to different ICLIDs, to map this ICLID information to other pieces of information or other formats, etc.

Figure 3:
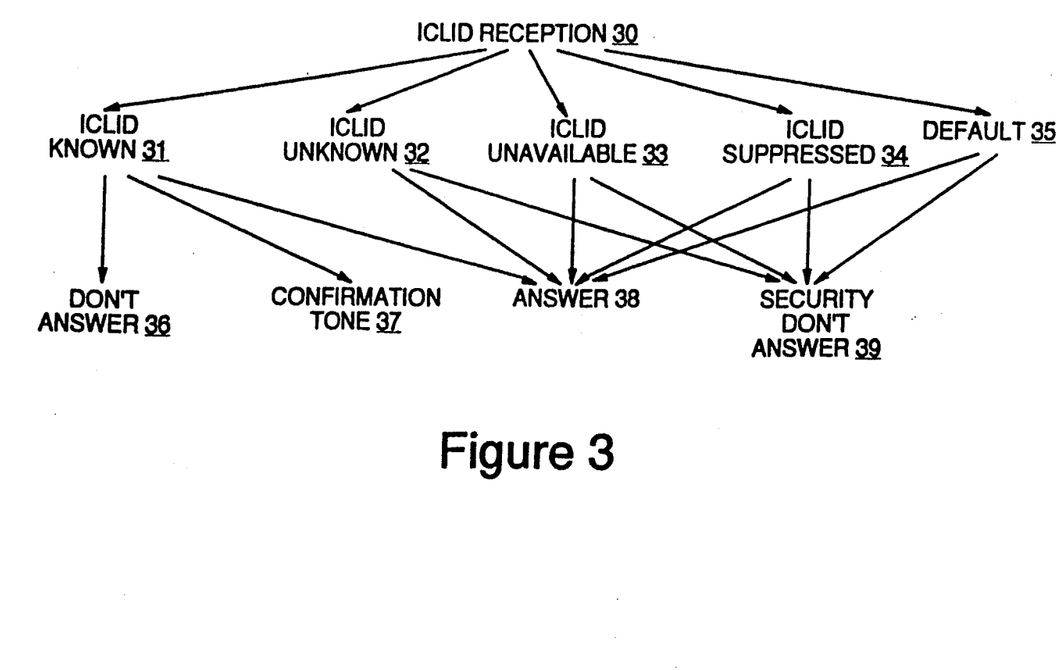
FIG. 3 illustrates the control flow for the fully configured system.

For example, with reference to FIG. 3, a typical decision tree followed by processing means 20 in response to an ICLID transmission and reception might be as shown. ICLID reception 30 occurs. This corresponds to the completion of step (5) above. In response to the ICLID reception, the processing means 20 can determine whether the name/number is known 31 or unknown 32 via table or database lookup, whether the ICLID was unavailable 33, or suppressed by the calling party 34 (also known as "invoking privacy"), or if there was some other condition such as the ICLID being received but corrupted and other default conditions 35.

There are three basic responses that can be generated by the processing means 20. The call can be ignored (don't answer) and the ICLID information received and stored. The call can be answered very briefly (less than one second) and a confirmation tone applied. If the call is answered and the confirmation tone is very brief then billing is not engaged by the telephone company and the confirmation tone has been received for free. Finally, the call can be answered and appropriate voice or machine prompts can be provided.

The ICLID information 30 can be used by the processing means 20 to screen incoming calls and determine the response to generate. For example, if the ICLID is known 31 an answer may not be necessary 36—an example of a "please call me" message, or no answer for security screening. Alternatively, a short confirmation tone 37 could be applied to the line to confirm receipt of the ICLID guaranteeing the ability to return the call, or the call could be answered 38 to allow the caller to leave messages or gain access to the system.

If the ICLID is not known 32 to the processing means 20 then the system could answer the call and use voice prompts, or some other means, to elicit the corresponding information from the calling party. Alternatively, the processing means 20 could refuse to answer the call 39 as a security measure.

If the delivery of the ICLID has been suppressed 34 the processing means 20 can take this as an indication of the intent of the caller and refuse to answer the call 39. If the system is being used in a customer service setting, for example, the processing means 20 could decide to answer the call anyway 38.

The ICLID delivery could be corrupted, the system could experience difficulties, unforeseen issues may occur. These default conditions 35 may result in either an answer 38 or don't answer 39 state as defined by the operator of the system.

Figure 4:
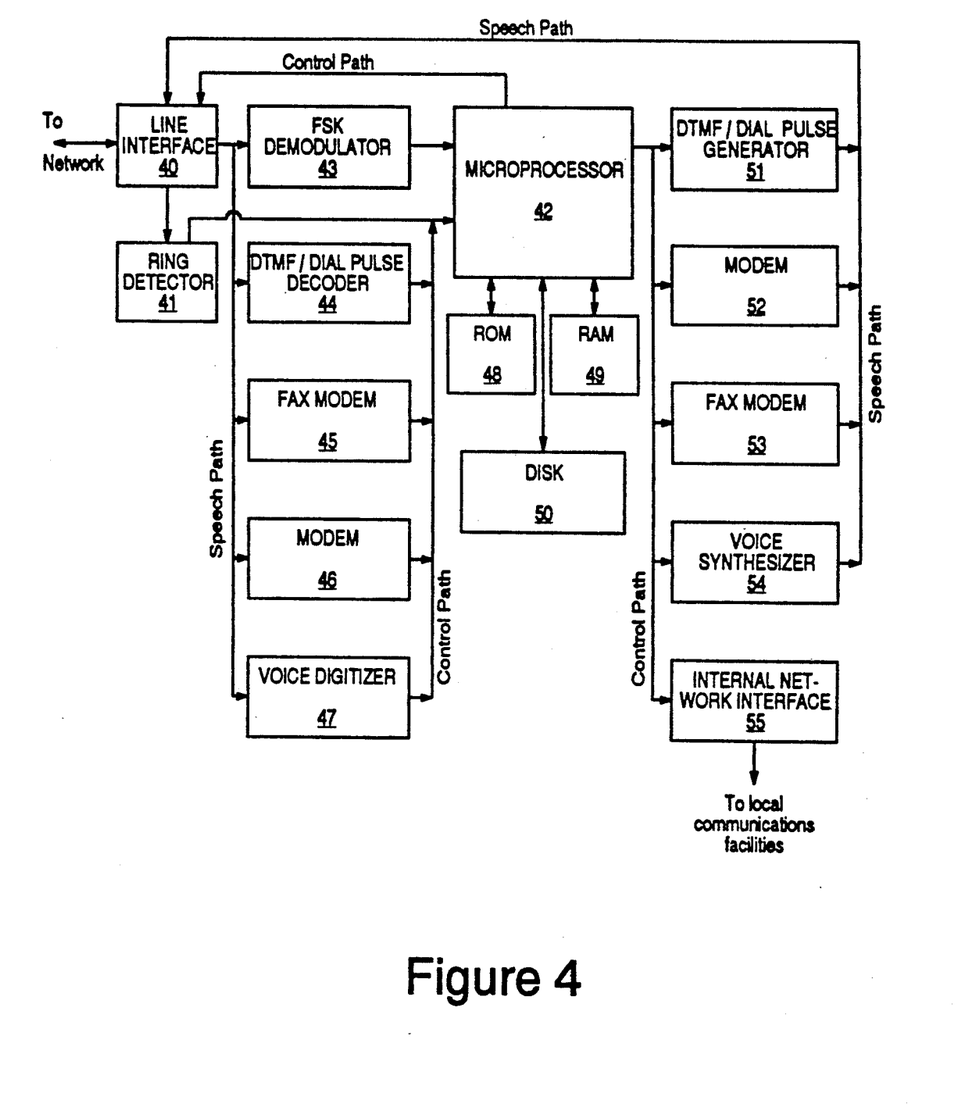
FIG. 4 illustrates a more detailed view of a fully configured system for CLASS/CMS ICLID mechanisms.

With reference to FIG. 4, we will now investigate an example of a fully configured system for the receipt of CLASS/CMS ICLID information. The vast majority of the system is the same for all forms of ICLID reception. Only the line interface 40, the ring detector 41, and the FSK demodulator 43 are likely to change with different forms of ICLID reception. One reasonably skilled in the art would be able to replace these portions of the system with their counterparts for other signalling mechanisms (such as CENTREX®, or ISDN) simply with reference to the corresponding standards and utilizing commercially available components and subsystems.

Within the context of the CLASS/CMS ICLID example, the system operates as follows. The line interface 40 provides the proper electrical termination characteristics to satisfy EIA RS-470 and Bellcore TR-TSY-000030 requirements. It also has the ability to go to the on hook or off hook states as directed by the microprocessor 42. The ring detector 41 detects the presence or absence of power ring (nominal 88V AC superimposed on −48V DC) and signals this condition to the microprocessor 42. This information is used by the microprocessor 42 to determine the timing of the ring signals in order to take advantage of the coded ring signalling (commonly known as "Distinctive Ringing") available from the LECs (Local Exchange Carriers).

The FSK (Frequency Shift Key) demodulator 43 converts the FSK ICLID transmission to a TTL level bit stream and forwards it to the microprocessor 42. The microprocessor then stores this information in RAM 49 or on DISK 50. The microprocessor 42 can then use the ICLID transmission as an index into a database stored in RAM 49 or on DISK 50. This database can contain information such as the name associated with the number (or vice versa), the security clearance, etc. Once the database search has been completed, the microprocessor 42 can decide whether to not answer the call, to give a confirmation tone, or to answer the incoming call.

The microprocessor 42 uses software stored in ROM 48, RAM 49, or on secondary storage such as DISK 50 to determine how to answer the incoming call. As illustrated, a number of options are available. The microprocessor 42 directs the line interface 40 to go to the off hook state. The microprocessor 42 can then instruct the voice synthesizer 54 to place voice prompts on the telephone line. In response to these voice prompts the calling party may enter DTMF or Dial Pulse signals, FAX signals, MODEM signals, or attempt to leave a voice message. These responses can be received and interpreted by the microprocessor via one or more of the DTMF/Dial Pulse decoder 44, the FAX modem 45, the modem 46, or the voice digitizer 47.

Information about received calls is forwarded under control of the microprocessor 42 by directing the line interface 40 to go to the off hook state. It should be noted that it is not necessary that the line interface for outgoing calls be the same as the line interface for incoming calls. Using the same interface for incoming and outgoing calls reduces system cost but reduces system throughput. By placing the outgoing calls over a different line than the incoming calls, throughput can be increased at the expense of greater system complexity.

Once the line interface is in the off hook state, the microprocessor 42 can direct the DTMF/Dial Pulse generator to dial the predetermined destination for forwarding of the received ICLID information. When a connection has been established with the forwarding destination, the ICLID information could be forwarded using one or more of the DTMF/Dial Pulse generator 51, the modem 52, the FAX modem 53, or the voice synthesizer 54 (or other means) depending on whether the receiving party is a machine or a human being. If it is a human being, the voice synthesizer 54 could deliver a message such as "You have received a call from 555-5555" where "555-5555" represents the ICLID information received by the invention. If the ICLID information is being forwarded to another automated system then the more conventional data transmission means of DTMF/ Dial Pulse generation 51, modems 52, or FAX modems 53 could be used.

Alternatively, the ICLID information could be routed over internal network facilities such as private lines, or a LAN, using the internal network interface 55 to the local communications facilities.

Many further extensions to the operating sequences are, of course, possible. It is the intent of the present invention to disclose an ICLID driven platform for automated attendant operation. It is obvious that the present invention can be used for many other functions than as an automated attendant. For example, secure fax servers, data servers, and voice mail facilities could all be implemented using the ICLID as a first stage in a security system.

What I claim as my invention is:

1. A telephone interface apparatus for interfacing a telephone to the public switched telephone network comprising:

line interface means for interfacing the apparatus with the public switched telephone network;

data receiver means for receiving at least signalling information over the telephone network;

line state control means for placing the telephone interface apparatus in an off-hook and an on-hook condition;

dialling signal means for generating dialling signals onto the public switched telephone network;

logic control means including stored program means for interpreting received signalling information and controlling the status of the line state control means and the generation of dialling signals via the dialling signal means in accordance with preprogrammed instructions of the stored program means and in accordance with the received signalling information, said apparatus including confirmation signal generating means for generating a confirmation signal over the public switched telephone network while the line state control means has placed the apparatus momentarily in the off-hook condition for a period of time sufficient for the confirmation signal to be generated, in order to acknowledge receipt of the signalling information, whereby, in accordance with preprogrammed instructions of the stored program means and in accordance with the signalling information, if an incoming telephone call is not answered, a confirmation signal may be generated.

2. The apparatus as claimed in claim 1, including data transmitter means for transmitting data over the telephone network; and the logic control means further controls the reception and transmission of data via the data receiver means and the data transmitter means under control of the stored program means in accordance with preprogrammed instructions of the stored program means and in accordance with the signalling information.

3. The apparatus as claimed in claim 1, including any one or more in combination of modem means for the transmission and reception of digital data, facsimile modem means for the transmission and reception of facsimile transmissions, voice synthesizer means or voice playback means for the generation of voice messages upon the public switched telephone network and computer network interface means for interfacing the apparatus to a computer network, all under the control of the logic control means acting in accordance with preprogrammed instructions of the stored program means and in accordance with the signalling information.

4. A telephone interface apparatus for interfacing a telephone to the public switched telephone network comprising:

line interface means for interfacing the apparatus with a telephone line of the public switched telephone network;

data receiver means for receiving at least signalling information over the telephone network;

line state control means for placing the telephone apparatus in an off-hook and an on-hook condition;

data transmitter means for transmitting at least dialling signal data over the telephone network;

logic control means including stored program means for interpreting the signalling information and in accordance with preprogrammed instructions of the stored program means and in accordance with the signalling information if available, controlling the performance on non-performance of any combination of the operations of (i) answering an incoming call by placing the telephone apparatus in the off-hook condition by operation of the line state control means, and (ii) waiting for the telephone line to be free to dial an outgoing call, placing the telephone apparatus in the off-hook condition by operation of the line state control means, dialling a telephone number by generating dialling signals onto the public switched telephone network via the data transmitter means, and forwarding data onto the telephone line via the data transmitter means when the dialled telephone number has been answered, said apparatus including confirmation signal generating means for generating a confirmation signal over the public switched telephone network while the line state control means has placed the apparatus momentarily in the off-hook condition for a period of time sufficient for the confirmation signal to be generated, in order to acknowledge receipt of the signalling information, whereby, in accordance with preprogrammed instructions of the stored program means and in accordance with the signalling information, if the incoming call is not answered, a confirmation signal may be generated.

5. The apparatus as claimed in claim 4, including any one or more in combination of modem means for the transmission and reception of digital data, facsimile modem means for the transmission and reception of facsimile transmissions, voice synthesizer means or voice playback means for the generation of voice messages upon the public switched telephone network and computer network interface means for interfacing the apparatus to a computer network, all under the control of the logic control means acting in accordance with preprogrammed instructions of the stored program means and in accordance with the signalling information.

6. The apparatus as claimed in claim 4, including any one or more in combination of modem means for the transmission and reception of digital data, facsimile modem means for the transmission and reception of facsimile transmissions, voice synthesizer means or voice playback means for the generation of voice messages upon the public switched telephone network and computer network interface means for interfacing the apparatus to a computer network, all under the control of the logic control means acting in accordance with preprogrammed instructions of the stored program means and in accordance with the signalling information.

7. A method of responding to an incoming telephone call which includes signalling information on a telephone line connected to the public switched telephone network comprising the steps of (a) receiving said signalling information over the public switched telephone network;

(b) in accordance with the signalling information, and in accordance with preprogrammed computer instructions, performing or not performing any combination of the operations of
  (i) answering the incoming call, and
  (ii) waiting for the telephone line to be free to dial an outgoing call, going off-hook, and dialing a telephone number.

8. The method of claim 7, including the step of, if the incoming call is not answered and signalling information has been received,
  (a) momentarily placing the telephone line in the off-hook condition while the incoming telephone call is still active for a period of time sufficient to generate a confirmation signal to acknowledge receipt of the signalling information,
  (b) generating a confirmation signal onto the public switched telephone network to acknowledge receipt of the signalling information,
  (c) placing the telephone line in the on-hook condition.

9. The method of claim 7 wherein when the dialled telephone number is answered, information is forwarded in the form of data or voice.

10. The method of claim 9 wherein the data may be facsimile data for transmission to a facsimile machine at the dialled telephone number.

11. The method of claim 8 wherein when the dialled telephone number is answered, information is forwarded in the form of data or voice.

12. The method of claim 1 wherein the data may be facsimile data for transmission to a facsimile machine at the dialled telephone number.

13. A telephone interface apparatus for interfacing a telephone to the public switched telephone network comprising:
  line interface means for interfacing the apparatus with the public switched telephone network;
  data receiver means for receiving signalling information over the telephone network;
  line state control means for placing the telephone interface apparatus in an off-hook and an on-hook condition;
  dialling signal means for generating dialling signals onto the public switched telephone network;
  logic control means including stored program means for interpreting received signalling information and controlling the status of the line state control means and the generation of dialling signals via the dialling signal means in accordance with preprogrammed instructions of the stored program means and in accordance with the received signalling information, the logic control means causing an incoming calling party to be dialled back after signalling information has been received and the line is free to place an outgoing call, and the logic control means further causing the outgoing call to be transferred to a telephone of a human operator such that both the incoming calling party and the human operator are in communication when both the incoming calling party and the human operator have answered their respective telephones.

14. A telephone interface apparatus for interfacing a telephone to the public switched telephone network comprising:
  line interface means for interfacing the apparatus with the public switched telephone network;
  data receiver means for receiving signalling information over the telephone network;
  line state control means for placing the telephone interface apparatus in an of-hook and an on-hook condition;
  dialling signal means for generating dialling signals onto the public switched telephone network;
  logic control means including stored program means for interpreting received signalling information and controlling the status of the line state control means and the generation of dialling signals via the dialling signal means in accordance with preprogrammed instructions of the stored program means and in accordance with the received signalling information, the logic control means causing an incoming calling party to be dialled back after signalling information has been received and the line is free to place an outgoing call, and the logic control means further causing the outgoing call to be transferred to a predetermined destination such that both the incoming calling party and the predetermined destination are in communication when both the incoming calling part and the predetermined destination are in an off-hook condition.

* * * * *

REEXAMINATION CERTIFICATE (3539th)

United States Patent [19]

Callele

[11] B1 5,206,900

[45] Certificate Issued Jun. 9, 1998

[54] AUTOMATED ATTENDANT

[76] Inventor: David Callele, 2014 Cairns Avenue, Saskatoon, Saskatchewan, Canada

Reexamination Request:
No. 90/004,322, Aug. 9, 1996

Reexamination Certificate for:
Patent No.: 5,206,900
Issued: Apr. 27, 1993
Appl. No.: 708,722
Filed: May 31, 1991

[51] Int. Cl.$^6$ .............................. H04M 1/56; H04M 3/00
[52] U.S. Cl. .............................. 379/142; 379/265; 379/257
[58] Field of Search .............................. 379/67, 88, 89, 379/90, 93, 95, 96–99, 111, 112, 127, 126, 130, 140, 142, 201, 210, 211, 212, 213, 214, 246, 265, 266, 309, 257

[56] References Cited

U.S. PATENT DOCUMENTS

| | | | |
|---|---|---|---|
| 4,558,180 | 12/1985 | Scordo | 179/18 |
| 4,580,012 | 4/1986 | Matthews et al. | 179/18 |
| 4,680,785 | 7/1987 | Akiyama et al. | 179/18 |
| 4,747,127 | 5/1988 | Hansen et al. | 379/94 |
| 4,763,350 | 8/1988 | Immendorfer et al. | 379/67 |
| 4,821,308 | 4/1989 | Hashimoto | 179/2 |
| 4,825,456 | 4/1989 | Rosenburg | 379/57 |
| 4,825,460 | 4/1989 | Carter et al. | 379/67 |
| 4,852,149 | 7/1989 | Zwick et al. | 379/67 |
| 4,866,758 | 9/1989 | Heinzelmann | 379/94 |
| 4,868,860 | 9/1989 | Andros et al. | 340/825.44 |
| 4,926,461 | 5/1990 | Kouk | 379/88 |
| 4,926,462 | 5/1990 | Ladd et al. | 379/67 |
| 4,942,598 | 7/1990 | Davis | 379/57 |
| 4,961,216 | 10/1990 | Baehr et al. | 379/56 |
| 4,995,073 | 2/1991 | Okata et al. | 379/93 |
| 5,003,595 | 3/1991 | Collins et al. | 379/95 |
| 5,054,055 | 10/1991 | Hanle et al. | 379/142 |
| 5,062,133 | 10/1991 | Melrose | 379/142 |
| 5,155,761 | 10/1992 | Hammond | 379/142 |

*Primary Examiner*—Paul Loomis

[57] ABSTRACT

A device and method for interfacing a telephone to the telephone network is disclosed for receiving the ICLID of incoming telephone calls and responding in a predetermined manner. An ICLID receiver detects the presence or absence of the ICLID of an incoming telephone call, and receives the ICLID if present. In accordance with predetermined instructions and with the absence of an ICLID or the presence and identity of the ICLID, the device may acknowledge receipt of the ICLID to the incoming caller by generating a brief confirmation tone at minimum charge to the calling party, cause the incoming call to be answered or not answered, and may forward the incoming ICLID information to a predetermined location over the telephone network or by other means.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7–12 are cancelled.

Claims 1, 4, 13 and 14 are determined to be patentable as amended.

Claims 2–3 and 5–6, dependent on an amended claim, are determined to be patentable.

New claims 15–41 are added and determined to be patentable.

1. A telephone interface apparatus for interfacing a telephone to the public switched telephone network comprising:

line interface means for interfacing the apparatus with the public switched telephone network;

data receiver means for receiving at least signalling information over the telephone network;

line state control means for placing the telephone interface apparatus in an off-hook and an on-hook condition;

dialling signal means for generating dialling signals onto the public switched telephone network;

logic control means including stored program means for interpreting received signalling information and controlling the status of the line state control means and the generation of dialling signals via the dialling signal means in accordance with preprogrammed instructions of the stored program means and in accordance with the received signalling information, said apparatus including confirmation signal generating means for generating a confirmation signal over the public switched telephone network while the line state control means has placed the apparatus momentarily in the off-hook condition for a period of time sufficient for the confirmation signal to be generated, in order to acknowledge receipt of the signalling information, whereby, in accordance with preprogrammed instructions of the stored program means and in accordance with the signalling information, [if] *when* an incoming telephone call is not answered, a confirmation signal [may be] *is* generated.

4. A telephone interface apparatus for interfacing a telephone to the public switched telephone network comprising:

line interface means for interfacing the apparatus with a telephone line of the public switched telephone network;

data receiver means for receiving at least signalling information over the telephone network;

line state control means for placing the telephone apparatus in an off-hook and an on-hook condition;

data transmitter means for transmitting at least dialling signal data over the telephone network;

logic control means including stored program means for interpreting the signalling information and in accordance with preprogrammed instructions of the stored program means and in accordance with the signalling information if available, controlling the performance [on non-performance of any combination] *of each* of the operations of (i) answering an incoming call by placing the telephone apparatus in the off-hook condition by operation of the line state control means, and (ii) waiting for the telephone line to be free to dial an outgoing call, placing the telephone apparatus in the off-hook condition by operation of the line state control means, dialling a telephone number by generating dialling signals onto the public switched telephone network via the data transmitter means, and forwarding data onto the telephone line via the data transmitter means when the dialled telephone number has been answered, said apparatus including confirmation signal generating means for generating a confirmation signal over the public switched telephone network while the line state control means has placed the apparatus momentarily in the off-hook condition for a period of time sufficient for the confirmation signal to be generated, in order to acknowledge receipt of the signalling information, whereby, in accordance with preprogrammed instructions of the stored program means and in accordance with the signalling information, [if] *when* the incoming call is not answered, a confirmation signal [may be] *is* generated.

13. A telephone interface apparatus for interfacing a telephone to the public switched telephone network comprising:

line interface means for interfacing the apparatus with the public switched telephone network;

data receiver means for receiving signalling information over the telephone network;

line state control means for placing the telephone interface apparatus in an off-hook and an on-hook condition;

dialling signal means for generating dialling signals onto the public switched telephone network;

logic control means including stored program means for interpreting received signalling information and controlling the status of the line state control means and the generation of dialling signals via the dialling signal means in accordance with preprogrammed instructions of the stored program means and in accordance with the received signalling information, the logic control means causing an incoming calling party to be dialled back after signalling information has been received and the line is free to place an outgoing call, and the logic control means further causing the outgoing call to be transferred to a telephone of a human operator such that both the incoming calling party and the human operator are in communication when both the incoming calling party and the human operator have answered their respective telephones[.]; *and*

*wherein said signalling information is received and said logic control means causes the calling party to be dialed back in a manner such that the incoming call of the calling party is not deemed answered by a telephone billing system, and the calling party is not billed for the incoming call.*

14. A telephone interface apparatus for interfacing a telephone to the public switched telephone network comprising:

line interface means for interfacing the apparatus with the public switched telephone network;

data receiver means for receiving signalling information over the telephone network;

line state control means for placing the telephone interface apparatus in an off-hook and an on-hook condition;

dialling signal means for generating dialling signals onto the public switched telephone network;

logic control means including stored program means for interpreting received signalling information and controlling the status of the line state control means and the generation of dialling signals via the dialling signal means in accordance with preprogrammed instructions of the stored program means and in accordance with the received signalling information. the logic control means causing an incoming calling party to be dialled back after signalling information has been received and the line is free to place an outgoing call, and the logic control means further causing the outgoing call to be transferred to a predetermined destination such that both the incoming calling party and the predetermined destination are in communication when both the incoming calling [part] *party* and the predetermined destination are in an off-hook condition[.]*;* and

*wherein said signalling information is received and said logic control means causes the calling party to be dialed back in a manner such that the incoming call of the calling party is not deemed answered and the calling party is not billed for the incoming call.*

15. The apparatus of claim 13, further comprising means for receiving said signaling information without placing the telephone line in an off-hook state.

16. The apparatus of claim 13, further comprising means for receiving said signaling information in a short amount of time when the telephone line is in an off-hook state, said short amount of time being a short enough duration so that the calling party in not billed for the incoming call.

17. A telephone interface apparatus for interfacing a telephone to the public switched telephone network, comprising:

line interface means for interfacing the apparatus with a telephone line of the public switched telephone network;

data receiver means for receiving at least signaling information over the telephone network from an incoming call from a calling party;

line state control means for placing the telephone apparatus in an off-hook and an on-hook condition;

data transmitter means for transmitting at least dialing signal data over the telephone network;

logic control means including stored program means for interpreting the signaling information and in accordance with preprogrammed instructions of the stored program means and in accordance with the signaling information if available, controlling the performance of answering incoming calls by placing the telephone apparatus in the off-hook condition by operation of the line state control means; and said logic control means further comprising means for generating dialing signals in accordance with preprogrammed instructions in accordance with the received signaling information, and causing the incoming calling party to be dialed back after the signaling information has been received, and for receiving desired destination information and in accordance therewith making a call to a destination telephone dictated by the desired destination information so that both the calling party and the destination telephone are in communication; and means for receiving the signaling information and in response thereto dialing back the calling party in a manner such that the incoming call of the calling party is not deemed answered and the calling party is not billed for the incoming call.

18. The apparatus of claim 17, wherein said signaling information includes a signal that can be used to determine the source of the incoming call from the calling party.

19. The apparatus of claim 17, wherein said incoming call from the calling party is a toll call, and the signalling information is received and the calling party is not billed for the toll call.

20. A method of responding to an incoming telephone call from a calling party which includes signaling information on a telephone line connected to the public switched telephone network, the method comprising the steps of:

(a) receiving said signaling information over the public switched telephone network;

(b) in accordance with the received signaling information, and in accordance with preprogrammed computer instructions, performing the following operations:

(i) interpreting the received signaling information, and in accordance therewith waiting for the telephone line to be free to dial an outgoing call, going off-hook, and dialing back a telephone number of the calling party after the signaling information has been received and interpreted;

(ii) receiving destination information relating to a destination, that can be used to determine a telephone number of the destination;

(iii) dialing the telephone number of the destination; and (iv) effecting a telephonic connection between the destination, and the calling party that was dialed back in step (i). so that the calling party and the destination can be in communication with one another;

(c) receiving the signaling information from the calling party via the incoming call and performing steps (i)-(iv) in a manner such that the incoming call of the calling party is not deemed answered and the calling party is not billed for the incoming call.

21. The method of claim 20, further comprising the step of receiving the signaling information via the incoming call without placing the line corresponding to the incoming call in an off-hook state.

22. The method of claim 20, further comprising the step of receiving the signaling information in a short amount of time when the incoming line corresponding to the incoming call from the calling party is in an off-hook state, said short amount of time being short enough in duration so that the calling party is not billed for the incoming call.

23. The method of claim 20, wherein the signaling information includes a signal that is used to determine the origin of the incoming call.

24. The method of claim 20, wherein the signaling information includes one of ICLID and a ring signal.

25. The method of claim 20, where in said step (ii), the destination information is received from the calling party via the call back line.

26. The method of claim 20, wherein steps (i)-(iv) are performed in the order recited, and the telephonic connection effected between the calling party and the destination is in a manner such that the calling party and the destination are telephonically communicating when both are off-hook.

27. The apparatus of claim 14, further comprising means for receiving said signaling information without placing the telephone line in an off-hook state.

28. The apparatus of claim 14, further comprising means for receiving said signaling information in a short amount of time when the telephone line is in an off-hook state, said short amount of time being of a short enough duration so that the calling party is not billed for the incoming call.

29. A method of responding to an incoming telephone call from a calling party which includes signalling information on a telephone line connected to the public switched telephone network, the method comprising the steps of:

receiving said signalling information from the calling party over the public switched telephone network;

in accordance with the received signalling information, and in accordance with pre-programmed computer instructions, performing the following operations:

(a) interpreting the received signalling information, and in accordance therewith, waiting for the telephone line to be free to dial an outgoing call, going off-hook, and dialing back a telephone number of the calling party after the signalling information has been received and interpreted; and (b) receiving the signalling information from the calling party and performing step (a) in a manner such that the incoming call of the calling party is not deemed answered and the calling party is not billed for the incoming call.

30. The method of claim 29, wherein the signalling information includes a signal that is used to determine the original of the incoming call.

31. The method of claim 29, wherein the signalling information includes one of ICLID, and a ring signal.

32. A method of responding to an incoming telephone call from a calling party, which includes signalling information on a telephone line connected to the public switched telephone network, the method comprising the steps of:

receiving said signalling information via the incoming call over the public switched telephone network;

in accordance with the signalling information, and in accordance with pre-programmed computer instructions, performing the following operations (a) and (b);

(a) interpreting the received signalling information, and in accordance therewith, waiting for a telephone line to be free to dial an outgoing call, going off-hook, and dialing a predetermined destination telephone number after the signalling information has been received and interpreted;

(b) forwarding the interpreted signalling information to a predetermined destination associated with the predetermined destination telephone number; and receiving the signalling information from the calling party and performing step (a) in a manner such that the incoming call of the calling party is not deemed answered and the calling party is not billed for the incoming call.

33. The method of claim 32, wherein the signalling information includes a signal that is used to determine the origin of the incoming call.

34. The method of claim 32, wherein the signalling information includes one of a ring signal and ICLID.

35. A method of responding to an incoming telephone call from a calling party which includes signalling information on a telephone line connected to the public switched telephone network, the method comprising the steps of:

receiving said signalling information via the incoming call over the public switched telephone network;

in accordance with the received signalling information, and in accordance with pre-programmed computer instructions, interpreting the received signalling information so as to obtain interpreted signalling information, and in accordance with the interpreted signalling information forwarding the interpreted signalling information to a predetermined destination; and receiving the signalling information from the calling party, before it is interpreted, and performing said forwarding step, in a manner such that the incoming call of the calling party is not deemed answered and the calling party is not billed for the incoming call.

36. The method of claim 35, wherein the signalling information includes a signal that is used to determine the origin of the incoming call.

37. The method of claim 35, wherein the signalling information includes one of ICLID and a ring signal.

38. The method of claim 20, including the step of receiving the signalling information without placing the telephone line in an off-hook state.

39. The apparatus of claim 14, wherein said signalling information includes one of ICLID and a ring signal.

40. The apparatus of claim 13, wherein said signalling information includes one of ICLID and a ring signal.

41. The apparatus of claim 17, wherein said signalling information includes one of ICLID and a ring signal.

* * * * *